(12) United States Patent
Xue et al.

(10) Patent No.: US 10,124,394 B2
(45) Date of Patent: Nov. 13, 2018

(54) ONLINE ROUNDNESS CORRECTING DEVICE FOR SEMIFINISHED WHEEL

(71) Applicant: CITIC Dicastal CO., LTD, Qinhuangdao (CN)

(72) Inventors: Bowen Xue, Qinhuangdao (CN); Jiandong Guo, Qinhuangdao (CN)

(73) Assignee: CITIC DICASTAL CO., LTD. (CN)

( * ) Notice: Subject to any disclaimer, the term of this patent is extended or adjusted under 35 U.S.C. 154(b) by 106 days.

(21) Appl. No.: 15/364,356

(22) Filed: Nov. 30, 2016

(65) Prior Publication Data

US 2017/0182543 A1 Jun. 29, 2017

(30) Foreign Application Priority Data

Dec. 29, 2015 (CN) .......................... 2015 1 1006525

(51) Int. Cl.
*B21D 53/26* (2006.01)
*B21D 22/18* (2006.01)
*B21D 3/14* (2006.01)
*B21D 53/30* (2006.01)

(52) U.S. Cl.
CPC ............. *B21D 53/264* (2013.01); *B21D 3/14* (2013.01); *B21D 22/18* (2013.01); *B21D 53/30* (2013.01); *B60B 2310/20* (2013.01); *B60B 2900/911* (2013.01)

(58) Field of Classification Search
CPC ......... B21D 53/264; B21D 53/30; B21D 3/14
See application file for complete search history.

(56) References Cited

U.S. PATENT DOCUMENTS 4,821,548 A * 4/1989 Shinozawa .......... B21D 19/005
72/107

FOREIGN PATENT DOCUMENTS

EP            1424145 A2 *  6/2004  ............... B21D 3/14

* cited by examiner

*Primary Examiner* — Debra Sullivan
(74) *Attorney, Agent, or Firm* — Calfee, Halter & Griswold, LLP (57) ABSTRACT

The present invention relates to an online roundness correcting device for a semifinished wheel, which consists of a jacking and rotating system, a left correcting system, a right correcting system and a central locating system. According to the online roundness correcting device provided by the present invention, in service, an online roundness correcting function for the semifinished wheel can be achieved, and the corrected wheel has good roundness and cylindricity, so that not only can the labor intensity for workers be lowered, but also the online roundness correcting device has the characteristics of high degree of automation, advanced process, simple structure and safe and stable performance.

1 Claim, 7 Drawing Sheets

ONLINE ROUNDNESS CORRECTING DEVICE FOR SEMIFINISHED WHEEL

CROSS-REFERENCE TO RELATED APPLICATIONS

This application claims priority to Chinese Patent Application No. 201511006525.7, filed on Dec. 29, 2015, which is hereby incorporated by reference in its entirety.

TECHNICAL FIELD

The present invention relates to a roundness correcting device, in particular to an online roundness correcting device for a semifinished wheel.

BACKGROUND ART

During the heat treatment of an aluminum alloy wheel, the roundness of wheel flanges and rims will result in certain deformation due to influence caused by some factors, and the rate of finished products during machining will be seriously affected if roundness correction is not carried out. The conventional wheel roundness repairing method comprises the steps of manually holding a roundness gage with hands to find deformations, then, internally supporting the deformations forcefully with hydraulic cylinders, and carrying out approximate repair by virtue of experience, and this method has a little effect (not obvious) on wheels with roundness depressions and is not effective at all to wheels with roundness bulges. At the same time, this method is low in efficiency and high in labor intensity, the repair effect is far from ideal requirements, and the circumstance that the internal tissue of semifinished wheels is damaged due to excessive supporting probably occurs.

SUMMARY OF THE INVENTION

An object of the present invention is to provide an online roundness correcting device for a semifinished wheel, an online roundness correcting function for the semifinished wheel can be achieved, and the corrected wheel has good roundness and cylindricity.

An online roundness correcting device for a semifinished wheel comprises a jacking and rotating system, a left correcting system, a central locating system and a right correcting system.

The jacking and rotating system comprises a lower servo motor, a bottom plate, four guide posts, four guide sleeves, a rotary shaft, a lower rising and falling plate, a large bearing block, a four-jaw chuck, radial blocks, corner cylinders and two jacking hydraulic cylinders. The four guide sleeves are fixed on the bottom plate, and the four guide posts matched with the guide sleeves are fixed below the lower rising and falling plate. The two jacking hydraulic cylinders are fixed below the bottom plate, and output ends of the jacking hydraulic cylinders are hinged to the downside of the lower rising and falling plate. The large bearing block is fixed above the lower rising and falling plate, the lower servo motor is fixed below the lower rising and falling plate, and an output end of the lower servo motor is connected with the rotary shaft which is mounted in the large bearing block. The four-jaw chuck, of which four jaws are separately provided with the radial blocks and the corner cylinders, is fixed above the rotary shaft.

The left correcting system comprises a left platform, a left cross guide rail I, a left sliding table, a left hydraulic cylinder I, a left vertical plate, a left gear rack, a left vertical guide rail, a left plate I, a left gear I, a left servo motor I, a left servo motor II, a left plate II, a left plate III, a left plate IV, a left hydraulic cylinder II, a left gear II, a left servo motor III, a left cross guide rail II, a left sliding plate, a left belt pulley I, a left servo motor IV, a left synchronizing belt I, two left belt pulleys II, two left shafts I, two left bearing blocks I, left profiling rollers, a left shaft II, a left V-type roller, a left bearing block II, a left plate V, a left belt pulley III, a left synchronizing belt II and a left belt pulley IV. The left sliding table is mounted above the left platform through the left cross guide rail I, the left hydraulic cylinder I is also fixed above the left platform, and an output end of the left hydraulic cylinder I is connected with the left sliding table. The left vertical plate is fixed above the left sliding table. The left gear rack is fixed at the right side of the left vertical plate. The left plate I is mounted at the right side of the left vertical plate through the left vertical guide rail. The left plate II is fixed above the right side of the left plate I, and the left plate V is fixed below the right side of the left plate I. The left servo motor I, of which an output end is provided with the left gear I, is mounted at the right side of the left plate I. The left gear I is engaged with the left gear rack. The left servo motor II, of which an output end is provided with the left belt pulley IV, is fixed above the left plate V. The left bearing block II is also mounted above the left plate V, the left shaft II, of which the upside is provided with the left V-type roller and the downside is fixed with the left belt pulley III, is mounted inside the left bearing block II through a bearing, the upper end of the left shaft II is simultaneously mounted in a bearing on the left plate II, and the left belt pulley III and the left belt pulley IV are connected through the left synchronizing belt II. The left plate IV is mounted at the right side of the left vertical plate through the left vertical guide rail. The left plate III is fixed below the right side of the left plate IV. The left servo motor III, of which an output end is provided with the left gear II, is fixed at the right side of the left vertical plate, and the left gear II is engaged with the left gear rack. The left sliding plate is mounted above the left plate III through the left cross guide rail II. The left hydraulic cylinder II is also fixed above the left plate III, and an output end of the left hydraulic cylinder II is connected with the left sliding plate. The left servo motor IV, of which an output end is provided with the left belt pulley I, is fixed above the left sliding plate. The two left bearing blocks I are fixed below the left sliding plate, the two left shafts I, of which upper ends are fixed with the two left belt pulleys II and lower ends are provided with the left profiling rollers, are separately mounted inside the two left bearing blocks I through bearings, and the left belt pulley I and the two left belt pulleys II are connected through the left synchronizing belt I.

The central locating system comprises two clamping rollers, upper guide rails, two upper gear racks, two upper gears, an upper rising and falling plate, two upper hydraulic cylinders, four upper guide posts, four upper guide sleeves and a left upper sliding plate, the two clamping rollers are separately fixed below the left upper sliding plate and a right upper sliding plate, and the left upper sliding plate and the right upper sliding plate are mounted below the upper rising and falling plate through the upper guide rails. The two upper gear racks are separately fixed on the left upper sliding plate and the right upper sliding plate and are engaged with the two upper gears which are fixed below the upper rising and falling plate. A clamping cylinder is fixed below the upper rising and falling plate, and an output end of the clamping cylinder is connected with the upside of the right upper sliding plate. The four upper guide posts are fixed above the upper rising and falling plate and are matched with the four upper guide sleeves which are fixed at the top end of a machine frame. The two upper hydraulic cylinders are also fixed at the top end of the machine frame, and output ends of the two upper hydraulic cylinders are hinged to the upside of the upper rising and falling plate.

The right correcting system comprises the right upper sliding plate, the clamping cylinder, a right vertical plate, a right gear rack, a right vertical guide rail, a right plate I, a right gear I, a right servo motor I, a right servo motor II, a right plate II, a right plate III, a right plate IV, a right hydraulic cylinder II, a right gear II, a right servo motor III, a right cross guide rail II, a right sliding plate, a right belt pulley I, a right servo motor IV, a right synchronizing belt I, right belt pulleys II, two right shafts I, a right bearing block I, right profiling rollers, two right shafts II, right V-type rollers, two right bearing blocks II, a right plate V, two right belt pulleys III, a right synchronizing belt II, a right belt pulley IV, a right hydraulic cylinder I, a right sliding table, a right cross guide rail I and a right platform. The right sliding table is mounted above the right platform through the right cross guide rail I. The right hydraulic cylinder I is also fixed above the right platform, and an output end of the right hydraulic cylinder I is connected with the right sliding table. The right vertical plate is fixed above the right sliding table, and the right gear rack is fixed at the left side of the right vertical plate. The right plate I is mounted at the left side of the right vertical plate through the right vertical guide rail. The right plate II is fixed above the left side of the right plate I, and the right plate V is fixed below the left side of the right plate I. The right servo motor I, of which an output end is provided with the right gear I, is mounted at the left side of the right plate I. The right gear I is engaged with the right gear rack. The right servo motor II, of which an output end is provided with the right belt pulley IV, is fixed above the right plate V. The two right bearing blocks II are also mounted above the right plate V, the two right shafts II, of which upsides are separately provided with the right V-type rollers and downsides are separately fixed with the right belt pulleys III, are mounted inside the two right bearing blocks II through bearings, upper ends of the two right shafts II are simultaneously mounted in bearings on the right plate II, and the two right belt pulleys III and the right belt pulley IV are connected through the right synchronizing belt II. The right plate IV is mounted at the left side of the right vertical plate through the right vertical guide rail. The right plate III is fixed below the left side of the right plate IV. The right servo motor III, of which an output end is provided with the right gear II, is fixed at the left side of the right plate IV, and the right gear II is engaged with the right gear rack. The right sliding plate is mounted above the right plate III through the right cross guide rail II. The right hydraulic cylinder II is also fixed above the right plate III, and an output end of the right hydraulic cylinder II is connected with the right sliding plate. The right servo motor IV, of which an output end is provided with the right belt pulley I, is fixed above the right sliding plate. The right bearing block I is fixed below the right sliding plate, the two right shafts I, of which upper ends are fixed with the right belt pulleys II and lower ends are provided with the right profiling rollers, are separately mounted inside the right bearing block I through bearings, and the right belt pulley I and the right belt pulleys II are connected through the right synchronizing belt I.

During actual use, the central locating system enables a wheel on a roller way to be centrally located, the jacking hydraulic cylinders enable the four-jaw chuck to jack the wheel, the wheel is firstly located in the radial blocks and then is clamped by the four corner cylinders, and the lower servo motor can enable the clamped wheel to rotate. The right servo motor I can be used for achieving the locating of the two right V-type rollers in the height direction, the right servo motor II enables the right V-type rollers to rotate, and the right hydraulic cylinder I enables the two rotating right V-type rollers to be in contact with an outer rim of the wheel all the time and exert a supporting action. The right servo motor III is used for achieving the locating of the right profiling rollers in the height direction, the right servo motor IV enables the right profiling rollers to rotate, the right hydraulic cylinder II rightwards pulls the rotating right profiling rollers when a depression of the wheel is met, and the roundness of the depression can be recovered after the wheel rotates for a plurality of circles. The left servo motor I is used for achieving the locating of the left V-type roller in the height direction, and the left servo motor II enables the left V-type roller to rotate. The left servo motor III is used for achieving the locating of the two left profiling rollers in the height direction, the left servo motor IV drives the left profiling rollers to rotate, the left hydraulic cylinder II enables the two left profiling rollers to be in contact with an inner rim of the wheel all the time and exert a supporting action, the left hydraulic cylinder I enables the rotating left V-type roller to rightwards push a bulge of the wheel when the bulge of the wheel is met, and the roundness of the bulge can be recovered after the wheel rotates for a plurality of circles.

According to the online roundness correcting device provided by the present invention, in service, the online roundness correcting function for the semifinished wheel can be achieved, and the corrected wheel has good roundness and cylindricity, so that not only can the labor intensity for workers be lowered, but also the online roundness correcting device has the characteristics of high degree of automation, advanced process, simple structure and safe and stable performance.

In the figures, numeric symbols are as follows: 1—machine frame, 2—lower servo motor, 3—bottom plate, 4—guide post, 5—guide sleeve, 6—rotary shaft, 7—lower rising and falling plate, 8—large bearing block, 9—four-jaw chuck, 10—radial block, 11—corner cylinder, 12—left platform, 13—left cross guide rail I, 14—left sliding table, 15—left hydraulic cylinder I, 16—left vertical plate, 17—left gear rack, 18—left vertical guide rail, 19—left plate I, 20—left gear I, 21—left servo motor I, 22—left servo motor II, 23—left plate II, 24—left plate III, 25—left plate IV, 26—left hydraulic cylinder II, 27—left gear II, 28—left servo motor III, 29—left cross guide rail II, 30—left sliding plate, 31—left belt pulley I, 32—left servo motor IV, 33—left synchronizing belt I, 34—left belt pulley II, 35—left shaft I, 36—left bearing block I, 37—left profiling roller, 38—left shaft II, 39—left V-type roller, 40—left bearing block II, 41—left plate V, 42—left belt pulley III, 43—left synchronizing belt II, 44—left belt pulley IV, 45—clamping roller, 46—upper guide rail, 47—upper gear rack, 48—upper gear, 49—upper rising and falling plate 49, 50—upper hydraulic cylinder, 51—upper guide post, 52—upper guide sleeve, 53—left upper sliding plate, 54—right upper sliding plate, 55—clamping cylinder, 56—right vertical plate, 57—right gear rack, 58—right vertical guide rail, 59—right plate I, 60—right gear I, 61—right servo motor I, 62—right servo motor II, 63—right plate II, 64—right plate III, 65—right plate IV, 66—right hydraulic cylinder II, 67—right gear II, 68—right servo motor III, 69—right cross guide rail II, 70—right sliding plate, 71—right belt pulley I, 72—right servo motor IV, 73—right synchronizing belt I, 74—right belt pulley II, 75—right shaft I, 76—right bearing block I, 77—right profiling roller, 78—right shaft II, 79—right V-type roller, 80—right bearing block II, 81—right plate V, 82—right belt pulley III, 83—right synchronizing belt II, 84—right belt pulley IV, 85—right hydraulic cylinder I, 86—right sliding table, 87—right cross guide rail I, 88—right platform and 89—jacking hydraulic cylinder.

DETAILED DESCRIPTION OF THE INVENTION

In the following, the details and working conditions of a specific device provided by the present invention are described in combination with the figures.

An online roundness correcting device for a semifinished wheel comprises a jacking and rotating system, a left correcting system, a central locating system and a right correcting system.

Figure 1:
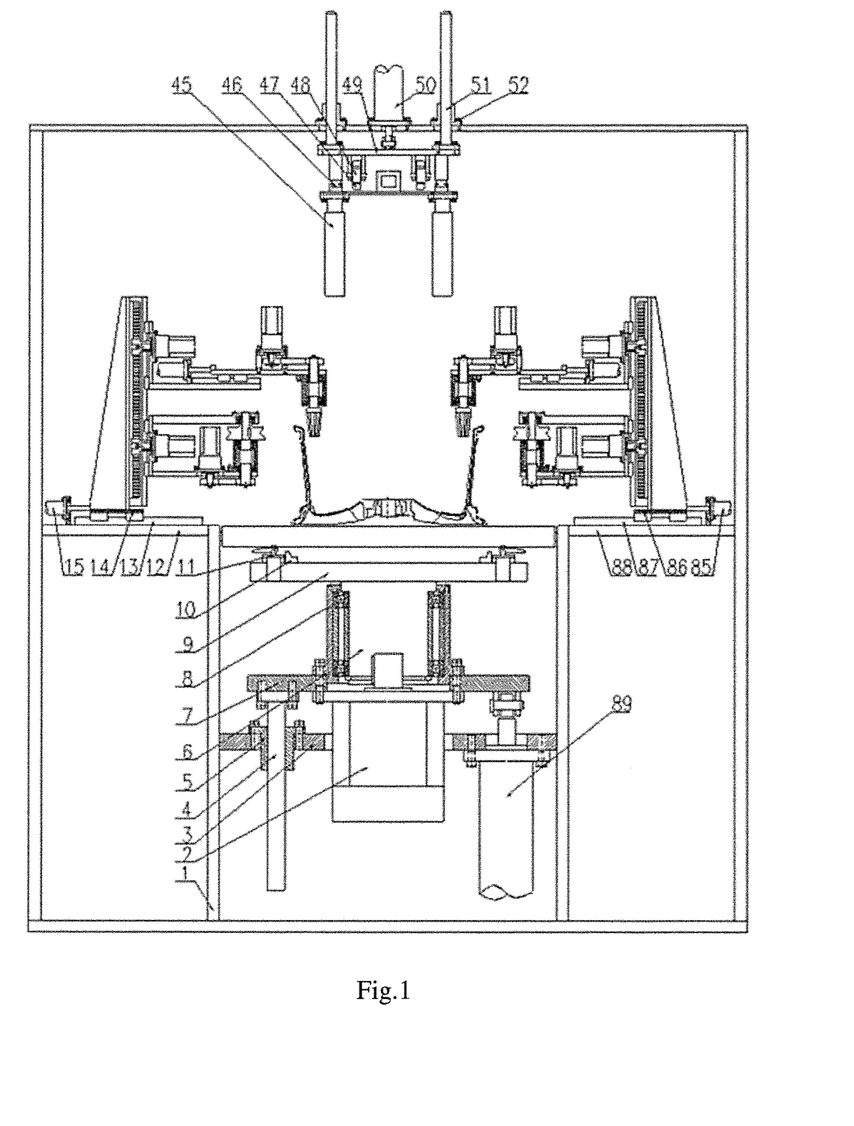
FIG. 1 is a front view of an online roundness correcting device for a semifinished wheel.
Figure 2:
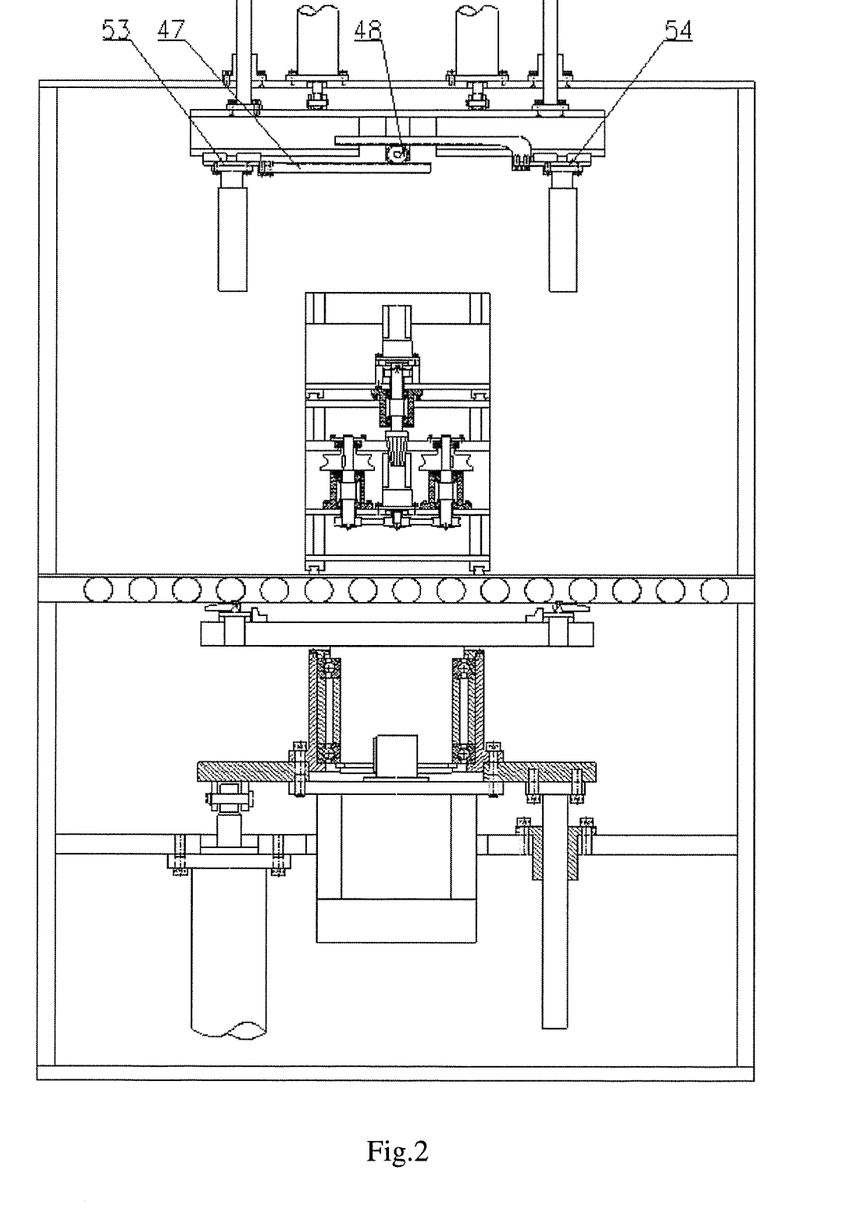
FIG. 2 is a local left view of an online roundness correcting device for a semifinished wheel.
Figure 3:
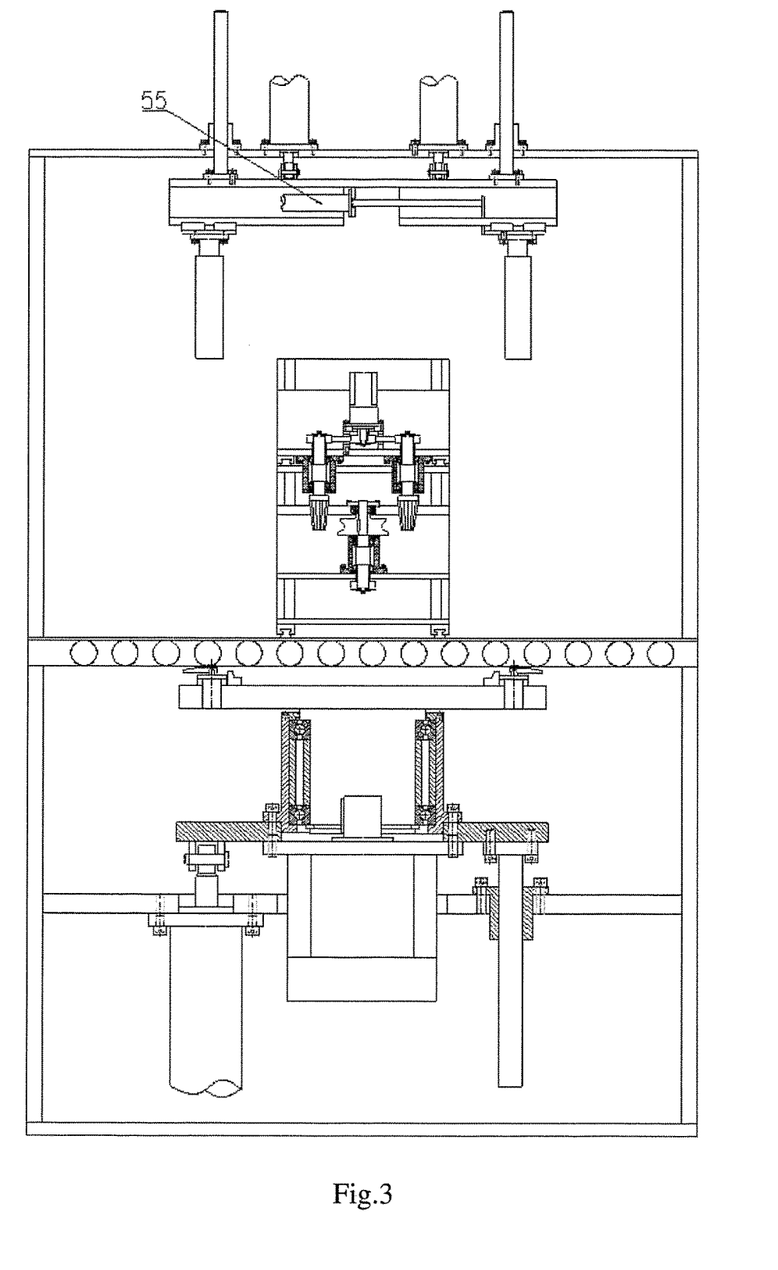
FIG. 3 is a local right view of an online roundness correcting device for a semifinished wheel.
Figure 6:
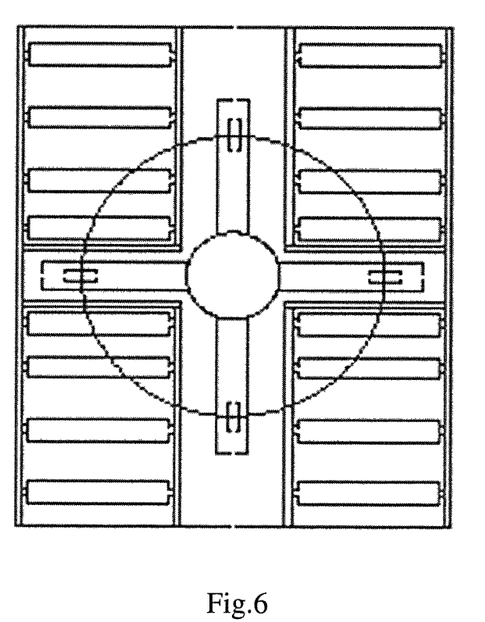
FIG. 6 is a top view of a jacking and rotating system of an online roundness correcting device for a semifinished wheel.

The jacking and rotating system comprises a lower servo motor 2, a bottom plate 3, guide posts 4, guide sleeves 5, a rotary shaft 6, a lower rising and falling plate 7, a large bearing block 8, a four-jaw chuck 9, radial blocks 10, corner cylinders 11 and jacking hydraulic cylinders 89. The four guide sleeves 5 are fixed on the bottom plate 3, and the four guide posts 4 matched with the guide sleeves 5 are fixed below the lower rising and falling plate 7. The two jacking hydraulic cylinders 89 are fixed below the bottom plate 3, and output ends of the jacking hydraulic cylinders 89 are hinged to the downside of the lower rising and falling plate 7. The large bearing block 8 is fixed above the lower rising and falling plate 7, the lower servo motor 2 is fixed below the lower rising and falling plate 7, and an output end of the lower servo motor 2 is connected with the rotary shaft 6 which is mounted in the large bearing block 8. The four-jaw chuck 9, of which four jaws are separately provided with the radial blocks 10 and the corner cylinders 11, is fixed above the rotary shaft 6.

Figure 7:
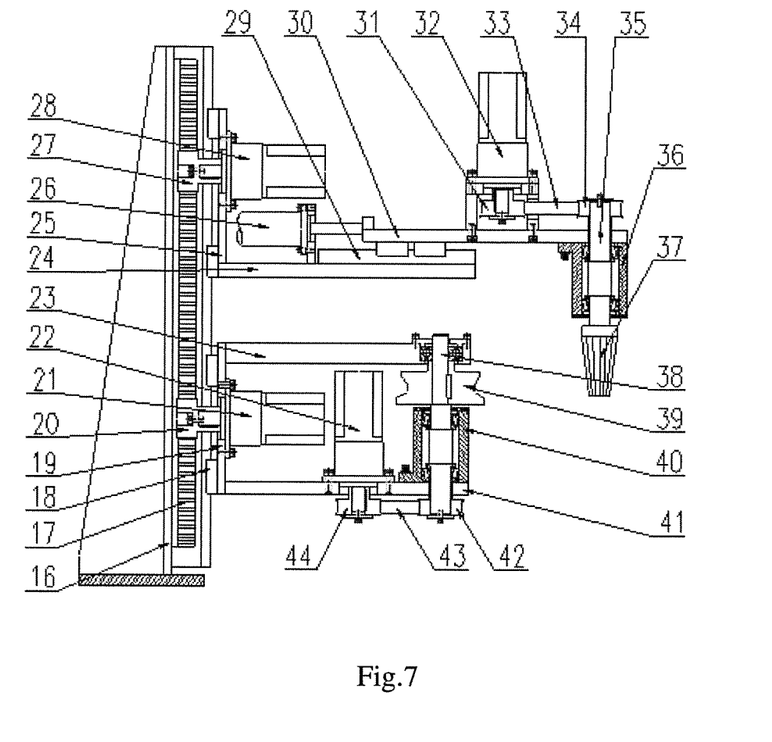
FIG. 7 is a front view of a left correcting system of an online roundness correcting device for a semifinished wheel.

The left correcting system comprises a left platform 12, a left cross guide rail I 13, a left sliding table 14, a left hydraulic cylinder I 15, a left vertical plate 16, a left gear rack 17, a left vertical guide rail 18, a left plate I 19, a left gear I 20, a left servo motor I 21, a left servo motor II 22, a left plate II 23, a left plate III 24, a left plate IV 25, a left hydraulic cylinder II 26, a left gear II 27, a left servo motor III 28, a left cross guide rail II 29, a left sliding plate 30, a left belt pulley I 31, a left servo motor IV 32, a left synchronizing belt I 33, left belt pulleys II 34, left shafts I 35, left bearing blocks I 36, left profiling rollers 37, a left shaft II 38, a left V-type roller 39, a left bearing block II 40, a left plate V 41, a left belt pulley III 42, a left synchronizing belt II 43 and a left belt pulley IV 44. The left sliding table 14 is mounted above the left platform 12 through the left cross guide rail I 13, the left hydraulic cylinder I 15 is also fixed above the left platform 12, and an output end of the left hydraulic cylinder I 15 is connected with the left sliding table 14. The left vertical plate 16 is fixed above the left sliding table 14. The left gear rack 17 is fixed at the right side of the left vertical plate 16. The left plate I 19 is mounted at the right side of the left vertical plate 16 through the left vertical guide rail 18. The left plate II 23 is fixed above the right side of the left plate I 19, and the left plate V 41 is fixed below the right side of the left plate I 19. The left servo motor I 21, of which an output end is provided with the left gear I 20, is mounted at the right side of the left plate I 19. The left gear I 20 is engaged with the left gear rack 17. The left servo motor II 22, of which an output end is provided with the left belt pulley IV 44, is fixed above the left plate V 41. The left bearing block II 40 is also mounted above the left plate V 41, the left shaft II 38, of which the upside is provided with the left V-type roller 39 and the downside is fixed with the left belt pulley III 42, is mounted inside the left bearing block II 40 through a bearing, the upper end of the left shaft II 38 is simultaneously mounted in a bearing on the left plate II 23, and the left belt pulley III 42 and the left belt pulley IV 44 are connected through the left synchronizing belt II 43. The left plate IV 25 is mounted at the right side of the left vertical plate 16 through the left vertical guide rail 18. The left plate III 24 is fixed below the right side of the left plate IV 25. The left servo motor III 28, of which an output end is provided with the left gear II 27, is fixed at the right side of the left vertical plate 16, and the left gear II 27 is engaged with the left gear rack 17. The left sliding plate 30 is mounted above the left plate III 24 through the left cross guide rail II 29. The left hydraulic cylinder II 26 is also fixed above the left plate III 24, and an output end of the left hydraulic cylinder II 26 is connected with the left sliding plate 30. The left servo motor IV 32, of which an output end is provided with the left belt pulley I 31, is fixed above the left sliding plate 30. The two left bearing blocks I 36 are fixed below the left sliding plate 30, the two left shafts I 35, of which upper ends are fixed with the left belt pulleys II 34 and lower ends are provided with the left profiling rollers 37, are separately mounted inside the two left bearing blocks I 36 through bearings, and the left belt pulley I 31 and the two left belt pulleys II 34 are connected through the left synchronizing belt I 33.

The central locating system comprises clamping rollers 45, upper guide rails 46, upper gear racks 47, upper gears 48, an upper rising and falling plate 49, upper hydraulic cylinders 50, upper guide posts 51, upper guide sleeves 52 and a left upper sliding plate 53. The two clamping rollers 45 are separately fixed below the left upper sliding plate 53 and a right upper sliding plate 54, and the left upper sliding plate 53 and the right upper sliding plate 54 are mounted below the upper rising and falling plate 49 through the upper guide rails 46. The two upper gear racks 47 are separately fixed on the left upper sliding plate 53 and the right upper sliding plate 54 and are engaged with the two upper gears 48 which are fixed below the upper rising and falling plate 49. The clamping cylinder 55 is fixed below the upper rising and falling plate 49, and an output end of the clamping cylinder 55 is connected with the upside of the right upper sliding plate 54. The four upper guide posts 51 are fixed above the upper rising and falling plate 49 and are matched with the four upper guide sleeves 52 which are fixed at the top end of a machine frame 1. The two upper hydraulic cylinders 50 are also fixed at the top end of the machine frame 1, and output ends of the two upper hydraulic cylinders 50 are hinged to the upside of the upper rising and falling plate 49.

Figure 8:
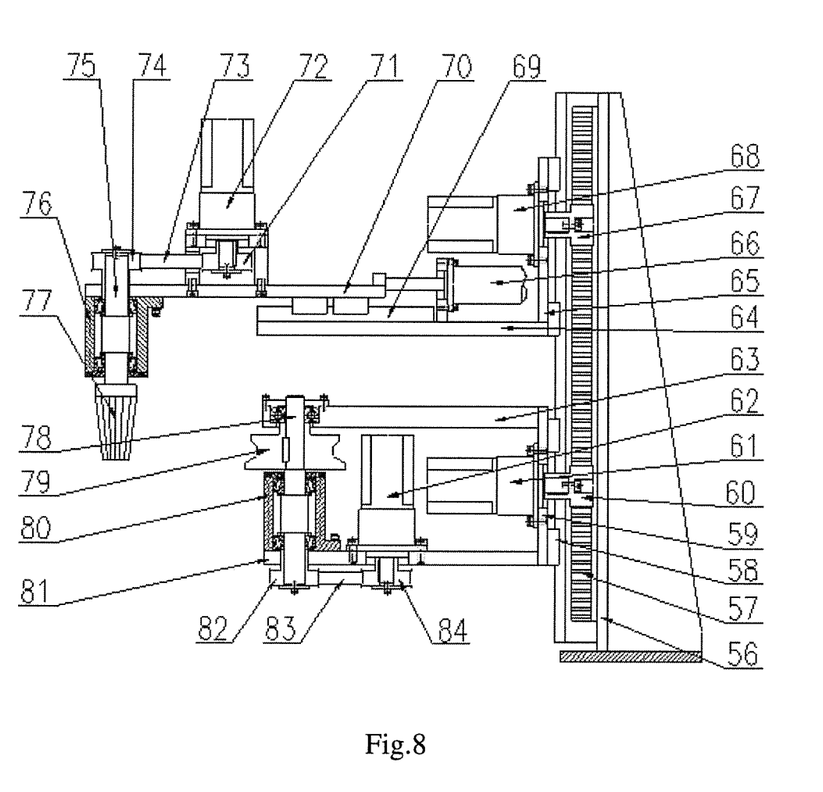
FIG. 8 is a front view of a right correcting system of an online roundness correcting device for a semifinished wheel.

The right correcting system comprises the right upper sliding plate 54, a clamping cylinder 55, a right vertical plate 56, a right gear rack 57, a right vertical guide rail 58, a right plate I 59, a right gear I 60, a right servo motor I 61, a right servo motor II 62, a right plate II 63, a right plate III 64, a right plate IV 65, a right hydraulic cylinder II 66, a right gear II 67, a right servo motor III 68, a right cross guide rail II 69, a right sliding plate 70, a right belt pulley I 71, a right servo motor IV 72, a right synchronizing belt I 73, right belt pulleys II 74, right shafts I 75, a right bearing block I 76, right profiling rollers 77, right shafts II 78, right V-type rollers 79, right bearing blocks II 80, a right plate V 81, right belt pulleys III 82, a right synchronizing belt II 83, a right belt pulley IV 84, a right hydraulic cylinder I 85, a right sliding table 86, a right cross guide rail I 87 and a right platform 88. The right sliding table 86 is mounted above the right platform 88 through the right cross guide rail I 87. The right hydraulic cylinder I 85 is also fixed above the right platform 88, and an output end of the right hydraulic cylinder I 85 is connected with the right sliding table 86. The right vertical plate 56 is fixed above the right sliding table 86, and the right gear rack 57 is fixed at the left side of the right vertical plate 56. The right plate I 59 is mounted at the left side of the right vertical plate 56 through the right vertical guide rail 58. The right plate II 63 is fixed above the left side of the right plate I 59, and the right plate V 81 is fixed below the left side of the right plate I 59. The right servo motor I 61, of which an output end is provided with the right gear I 60, is mounted at the left side of the right plate I 59. The right gear I 60 is engaged with the right gear rack 57. The right servo motor II 62, of which an output end is provided with the right belt pulley IV 84, is fixed above the right plate V 81. The two right bearing blocks II 80 are also mounted above the right plate V 81, the two right shafts II 78, of which upsides are separately provided with the right V-type rollers 79 and downsides are separately fixed with the right belt pulleys III 82, are mounted inside the two right bearing blocks II 80 through bearings, upper ends of the two right shafts II 78 are simultaneously mounted in bearings on the right plate II 63, and the two right belt pulleys III 82 and the right belt pulley IV 84 are connected through the right synchronizing belt II 83. The right plate IV 65 is mounted at the left side of the right vertical plate 56 through the right vertical guide rail 58. The right plate III 64 is fixed below the left side of the right plate IV 65. The right servo motor III 68, of which an output end is provided with the right gear II 67, is fixed at the left side of the right plate IV 65, and the right gear II 67 is engaged with the right gear rack 57. The right sliding plate 70 is mounted above the right plate III 64 through the right cross guide rail II 69. The right hydraulic cylinder II 66 is also fixed above the right plate III 64, and an output end of the right hydraulic cylinder II 66 is connected with the right sliding plate 70. The right servo motor IV 72, of which an output end is provided with the right belt pulley I 71, is fixed above the right sliding plate 70. The right bearing block I 76 is fixed below the right sliding plate 70, the two right shafts I 75, of which upper ends are fixed with the right belt pulleys II 74 and lower ends are provided with the right profiling rollers 77, are separately mounted inside the right bearing block I 76 through bearings, and the right belt pulley I 71 and the right belt pulleys II 74 are connected through the right synchronizing belt I 73.

Figure 4:
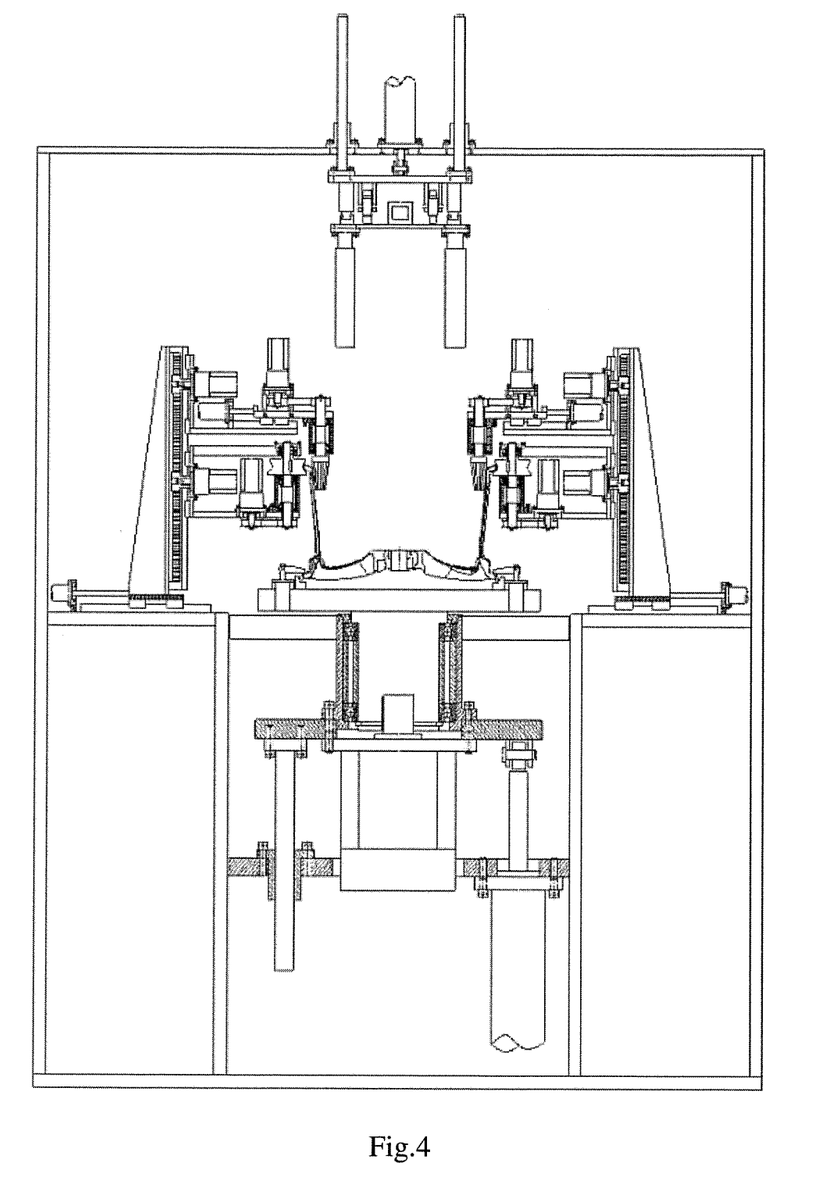
FIG. 4 is a front view of an online roundness correcting device for a semifinished wheel during work.
Figure 5:
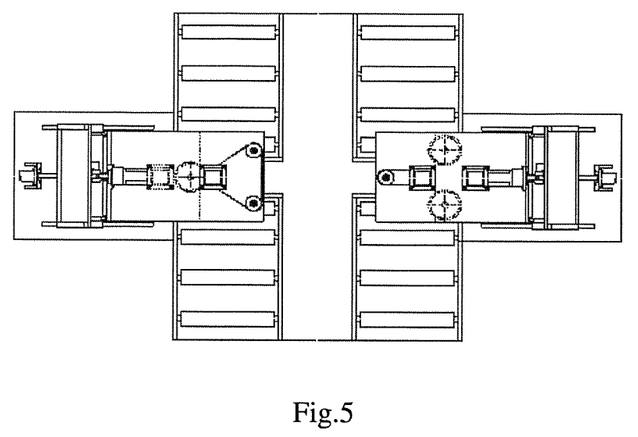
FIG. 5 is a top view of left and right correcting systems of an online roundness correcting device for a semifinished wheel.

During work, the central locating system enables a wheel on a roller way to be centrally located, the jacking hydraulic cylinders 89 enable the four-jaw chuck 9 to jack the wheel, the wheel is firstly located in the radial blocks 10 and then is clamped by the four corner cylinders 11, and the lower servo motor 2 can enable the clamped wheel to rotate. The right servo motor I 61 can be used for achieving the locating of the two right V-type rollers 79 in the height direction, the right servo motor II 62 enables the right V-type rollers 79 to rotate, and the right hydraulic cylinder I 85 enables the two rotating right V-type rollers 79 to be in contact with an outer rim of the wheel all the time and exert a supporting action. The right servo motor III 68 is used for achieving the locating of the right profiling rollers 77 in the height direction, the right servo motor IV 72 enables the right profiling rollers 77 to rotate, the right hydraulic cylinder II 66 rightwards pulls the rotating right profiling rollers 77 when a depression of the wheel is met, and the roundness of the depression can be recovered after the wheel rotates for a plurality of circles. The left servo motor I 21 is used for achieving the locating of the left V-type roller 39 in the height direction, and the left servo motor II 22 enables the left V-type roller 39 to rotate. The left servo motor III 28 is used for achieving the locating of the two left profiling rollers 37 in the height direction, the left servo motor IV 32 drives the left profiling rollers 37 to rotate, the left hydraulic cylinder II 26 enables the two left profiling rollers 37 to be in contact with an inner rim of the wheel all the time and exert a supporting action, the left hydraulic cylinder I 15 enables the rotating left V-type roller 39 to rightwards push a bulge of the wheel when the bulge of the wheel is met, and the roundness of the bulge can be recovered after the wheel rotates for a plurality of circles.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:
1. An online roundness correcting device for a semifinished wheel, which comprises a jacking and rotating system, a left correcting system, a central locating system and a right correcting system, and is characterized in that:
   the jacking and rotating system comprises a lower servo motor, a bottom plate, four guide posts, four guide sleeves, a rotary shaft, a lower rising and falling plate, a large bearing block, a four-jaw chuck, radial blocks, corner cylinders and two jacking hydraulic cylinders; the four guide sleeves are fixed on the bottom plate, and the four guide posts matched with the guide sleeves are fixed below the lower rising and falling plate; the two jacking hydraulic cylinders are fixed below the bottom plate, and output ends of the jacking hydraulic cylinders are hinged to the downside of the lower rising and falling plate; the large bearing block is fixed above the lower rising and falling plate, the lower servo motor is fixed below the lower rising and falling plate, and an output end of the lower servo motor is connected with the rotary shaft which is mounted in the large bearing block; the four-jaw chuck, of which four jaws are separately provided with the radial blocks and the corner cylinders, is fixed above the rotary shaft;

the left correcting system comprises a left platform, a left cross guide rail I, a left sliding table, a left hydraulic cylinder I, a left vertical plate, a left gear rack, a left vertical guide rail, a left plate I, a left gear I, a left servo motor I, a left servo motor II, a left plate II, a left plate III, a left plate IV, a left hydraulic cylinder II, a left gear II, a left servo motor III, a left cross guide rail II, a left sliding plate, a left belt pulley I, a left servo motor IV, a left synchronizing belt I, two left belt pulleys II, two left shafts I, two left bearing blocks I, left profiling rollers, a left shaft II, a left V-type roller, a left bearing block II, a left plate V, a left belt pulley III, a left synchronizing belt II and a left belt pulley IV; the left sliding table is mounted above the left platform through the left cross guide rail I, the left hydraulic cylinder I is also fixed above the left platform, and an output end of the left hydraulic cylinder I is connected with the left sliding table; the left vertical plate is fixed above the left sliding table; the left gear rack is fixed at the right side of the left vertical plate; the left plate I is mounted at the right side of the left vertical plate through the left vertical guide rail; the left plate II is fixed above the right side of the left plate I, and the left plate V is fixed below the right side of the left plate I; the left servo motor I, of which an output end is provided with the left gear I, is mounted at the right side of the left plate I; the left gear I is engaged with the left gear rack; the left servo motor II, of which an output end is provided with the left belt pulley IV, is fixed above the left plate V; the left bearing block II is also mounted above the left plate V, the left shaft II, of which the upside is provided with the left V-type roller and the downside is fixed with the left belt pulley III, is mounted inside the left bearing block II through a bearing, the upper end of the left shaft II is simultaneously mounted in a bearing on the left plate II, and the left belt pulley III and the left belt pulley IV are connected through the left synchronizing belt II; the left plate IV is mounted at the right side of the left vertical plate through the left vertical guide rail; the left plate III is fixed below the right side of the left plate IV; the left servo motor III, of which an output end is provided with the left gear II, is fixed at the right side of the left vertical plate, and the left gear II is engaged with the left gear rack; the left sliding plate is mounted above the left plate III through the left cross guide rail II; the left hydraulic cylinder II is also fixed above the left plate III, and an output end of the left hydraulic cylinder II is connected with the left sliding plate; the left servo motor IV, of which an output end is provided with the left belt pulley I, is fixed above the left sliding plate; the two left bearing blocks I are fixed below the left sliding plate, the two left shafts I, of which upper ends are fixed with the two left belt pulleys II and lower ends are provided with the left profiling rollers, are separately mounted inside the two left bearing blocks I through bearings, and the left belt pulley I and the two left belt pulleys II are connected through the left synchronizing belt I;

the central locating system comprises two clamping rollers, upper guide rails, two upper gear racks, two upper gears, an upper rising and falling plate, two upper hydraulic cylinders, four upper guide posts, four upper guide sleeves and a left upper sliding plate, the two clamping rollers are separately fixed below the left upper sliding plate and a right upper sliding plate, and the left upper sliding plate and the right upper sliding plate are mounted below the upper rising and falling plate through the upper guide rails; the two upper gear racks are separately fixed on the left upper sliding plate and the right upper sliding plate and are engaged with the two upper gears which are fixed below the upper rising and falling plate; a clamping cylinder is fixed below the upper rising and falling plate, and an output end of the clamping cylinder is connected with the upside of the right upper sliding plate; the four upper guide posts are fixed above the upper rising and falling plate and are matched with the four upper guide sleeves which are fixed at the top end of a machine frame; the two upper hydraulic cylinders are also fixed at the top end of the machine frame, and output ends of the two upper hydraulic cylinders are hinged to the upside of the upper rising and falling plate; and the right correcting system comprises the right upper sliding plate, the clamping cylinder, a right vertical plate, a right gear rack, a right vertical guide rail, a right plate I, a right gear I, a right servo motor I, a right servo motor II, a right plate II, a right plate III, a right plate IV, a right hydraulic cylinder II, a right gear II, a right servo motor III, a right cross guide rail II, a right sliding plate, a right belt pulley I, a right servo motor IV, a right synchronizing belt I, right belt pulleys II, two right shafts I, a right bearing block I, right profiling rollers, two right shafts II, right V-type rollers, two right bearing blocks II, a right plate V, two right belt pulleys III, a right synchronizing belt II, a right belt pulley IV, a right hydraulic cylinder I, a right sliding table, a right cross guide rail I and a right platform; the right sliding table is mounted above the right platform through the right cross guide rail I; the right hydraulic cylinder I is also fixed above the right platform, and an output end of the right hydraulic cylinder I is connected with the right sliding table; the right vertical plate is fixed above the right sliding table, and the right gear rack is fixed at the left side of the right vertical plate; the right plate I is mounted at the left side of the right vertical plate through the right vertical guide rail; the right plate II is fixed above the left side of the right plate I, and the right plate V is fixed below the left side of the right plate I; the right servo motor I, of which an output end is provided with the right gear I, is mounted at the left side of the right plate I; the right gear I is engaged with the right gear rack; the right servo motor II, of which an output end is provided with the right belt pulley IV, is fixed above the right plate V; the two right bearing blocks II are also mounted above the right plate V, the two right shafts II, of which upsides are separately provided with the right V-type rollers and downsides are separately fixed with the right belt pulleys III, are mounted inside the two right bearing blocks II through bearings, upper ends of the two right shafts II are simultaneously mounted in bearings on the right plate II, and the two right belt pulleys III and the right belt pulley IV are connected through the right synchronizing belt II; the right plate IV is mounted at the left side of the right vertical plate through the right vertical guide rail; the right plate III is fixed below the left side of the right plate IV; the right servo motor III, of which an output end is provided with the right gear II, is fixed at the left side of the right plate IV, and the right gear II is engaged with the right gear rack; the right sliding plate is mounted above the right plate III through the right cross guide rail II; the right hydraulic cylinder II is also fixed above the right plate III, and an output end of the right hydraulic cylinder II is connected with the right sliding plate; the right servo motor IV, of which an output end is provided with the right belt pulley I, is fixed above the right sliding plate; and the right bearing block I is fixed below the right sliding plate, the two right shafts I, of which upper ends are fixed with the right belt pulleys II and lower ends are provided with the right profiling rollers, are mounted inside the right bearing block I through bearings, and the right belt pulley I and the right belt pulleys II are connected through the right synchronizing belt I.

* * * * *